US009619804B1

(12) United States Patent
Thatte et al.

(10) Patent No.: US 9,619,804 B1
(45) Date of Patent: Apr. 11, 2017

(54) NETWORK OF BIOMETRICALLY SECURE DEVICES WITH ENHANCED PRIVACY PROTECTION

(71) Applicant: Clover Network, Inc., Sunnyvale, CA (US)

(72) Inventors: Sameer Jayant Thatte, Mountain View, CA (US); Arvin Carl Robert Haywood, Mountain View, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 15/072,252

(22) Filed: Mar. 16, 2016

(51) Int. Cl.
*G06Q 20/00* (2012.01)
*G06Q 20/40* (2012.01)
*G06Q 20/38* (2012.01)
*G06Q 20/20* (2012.01)
*H04L 9/30* (2006.01)

(52) U.S. Cl.
CPC ....... *G06Q 20/40145* (2013.01); *G06Q 20/20* (2013.01); *G06Q 20/3821* (2013.01); *H04L 9/30* (2013.01)

(58) Field of Classification Search
USPC .......................................................... 705/64
See application file for complete search history.

(56) References Cited

U.S. PATENT DOCUMENTS

| 4,736,203 | A | 4/1988 | Sidlauskas |
| 5,615,277 | A | 3/1997 | Hoffman |
| 6,694,025 | B1 * | 2/2004 | Epstein ............... H04L 9/0894 380/277 |
| 8,646,060 | B1 | 2/2014 | Ayed |
| 2003/0150911 | A1 * | 8/2003 | Joseph ................ G06K 17/00 235/382 |
| 2004/0122752 | A1 | 6/2004 | Horne et al. |

(Continued)

OTHER PUBLICATIONS

Granbury Solutions, FireFly Knowledge Base, Register a Finger Print, Available at: https://fireflypos.uservoice.com/knowledgebase/articles/596487-register-a-finger-print (Accessed on Mar. 11, 2016).

(Continued)

*Primary Examiner* — John Hayes
*Assistant Examiner* — John M Winter
(74) *Attorney, Agent, or Firm* — The Mueller Law Office, P.C.

(57) ABSTRACT

Various methods and devices that involve biometrically secured networked devices with enhanced privacy protection are disclosed. For example, a computer-implemented method for onboarding a first biometrically secured device to a network is disclosed. The method comprises generating an asymmetric key pair, transmitting the public key to a second device, and receiving an encrypted master encryption key from the second device. The master key is encrypted with the public key. The method also comprises decrypting the encrypted master encryption key using the private key and receiving an encrypted set of biometric data. The encrypted set of biometric data is a set of biometric data that is encrypted with the master encryption key. The method also comprises storing the set of biometric data on a memory of the first device. The set of biometric data uniquely identifies at least two users that are registered to use both the first and second devices.

24 Claims, 8 Drawing Sheets

(56) References Cited

U.S. PATENT DOCUMENTS

| | | |
|---|---|---|
| 2005/0109836 A1 | 5/2005 | Ben-Aissa |
| 2008/0282334 A1 | 11/2008 | Yves et al. |
| 2008/0319906 A1 | 12/2008 | Russell et al. |
| 2009/0037746 A1 | 2/2009 | Abdallah et al. |
| 2009/0153302 A1 | 6/2009 | Barnes et al. |
| 2014/0040145 A1 | 2/2014 | Ozvat et al. |
| 2014/0108173 A1 | 4/2014 | Cooper et al. |
| 2014/0214670 A1 | 7/2014 | McKenna |
| 2014/0344583 A1 | 11/2014 | Abdallah et al. |
| 2015/0381621 A1 | 12/2015 | Innes et al. |

OTHER PUBLICATIONS

Granbury Solutions, FireFly Point-of-Sale Home Page, Available at: http://www.granburyrs.com/solutions/firefly-point-of-sale (Accessed on Mar. 11, 2016).

Lee, McDonald's Testing Biometrics Technology on POS System, Biometric Update, Dec. 2, 2015. Available at: ww.biometricupdate.com/201512/mcdonalds-testing-biometrics-technology-on-pos-system (Accessed on Mar. 11, 2016).

\* cited by examiner

200

300

NETWORK OF BIOMETRICALLY SECURE DEVICES WITH ENHANCED PRIVACY PROTECTION

BACKGROUND OF THE INVENTION

Identity verification is an important feature of modern computerized devices. Computerized devices provide portals to sensitive control systems, financial information, and personal information that should only be accessible to a certain individual or set of people. Aside from security, identity verification can provide a degree of convenience for tracking use of the device or customizing the device for a particular user. In the case of a multiuser device, the device can use identity verification information to provide data or interfaces that are specifically applicable to a single user, or provide a more accurate record of which user conducted which actions using the device. For example, a point of sale (POS) device can keep track of which employee used the device to conduct a specific transaction. Furthermore, some multiuser devices are designed specifically for identification purposes such as time card systems that track when an employee clocked in for work, or electronically controlled access points that determine whether or not a user is authorized to pass through a physical barrier.

Traditional approaches for identity verification include verification operations conducted using various kinds of information that are colloquially referred to as: who you are, what you know, and what you have. Biometric (who you are) information is replacing passwords (what you know) information in an increasing number of applications due to its universality, permanence, and convenience. However, the permanence of biometric information has caused this increase in usage to be accompanied by increased privacy concerns. If a favorite password is compromised by an identity thief, a user can very easily switch to a different arbitrary string of characters. However, if biometric data is compromised, the situation is much more serious. Aside from its permanence, the simple fact that biometric information is a part of one's person makes it feel more personal. People that are not usually concerned with permanent personal information like their mother's maiden name being stored and used to identify them will sometimes balk at providing a fingerprint or iris scan to a third party. Furthermore, the use of biometric information often requires a time consuming registration process that involves training the device with multiple samples of whatever biometric data is being used. For example, the training procedures can involve multiple scans of a single fingerprint or multiple prompts for a vocal sample.

SUMMARY OF INVENTION

FIG. 1 illustrates a system 100 in which multiple users 101, 102, and 103 are registered to use various devices 110, 120, and 130. The various devices are secured by registering users 101, 102, and 103 as registered users for those devices. The registration information can be stored at server 140. When it is time to verify the identity of a user, the device can obtain verification information from the user, and transmit the information up to server 140 to be used in the verification procedure. In contrast to a typical situation in which a single user is assigned to a single device, such as in the case of a personal smartphone or workstation, system 100 illustrates a situation in which multiple users are registered to access a single device and a single user is registered to access multiple devices. As illustrated, each user is registered to operate at least two devices, and users 101, 102, and 103 are all registered to use device 120. An example of this kind of system is one in which a single employer registers multiple employees to use various devices at their workplace. For instance, devices 110 and 120 could be point of sale (POS) terminals used at a single store and users 101 and 102 could be check-out clerks at the store.

Various issues arise if system 100 involves the registration and verification of users through the use of biometric information. If devices 110, 120, and 130 are secured using biometric information, system 100 will store the biometric information at server 140 in order to conduct the verification procedure at the server as described above. However, this is problematic from a user perspective because users will generally be resistant to any system in which their biometric information is transported through a network or is stored externally from a single device. Furthermore, in some circumstances the users will not have a direct relationship with the operator or owner of server 140. In a particular example, devices 110, 120, and 130 are issued to the users by an employer while a third party maintains and operates server 140 for the benefit of the employer. As such, the users will be even less likely to find it acceptable to store their biometric information on server 140.

In an alternative approach, biometric information can be stored locally on the devices themselves. However, this is a suboptimal solution as well. In the illustrated case, user 101 will then have to register with device 110 and device 120 separately. Devices secured using biometric information compound this inefficiency because the provisioning of biometric data can often involve a lengthy training procedure. As such, neither the remote storage of biometric information nor the independent storage of the biometric information on the devices is an optimal solution.

Approaches disclosed herein provide a network of biometrically secured devices without the aforementioned limitations. In specific approaches, biometric information is obtained for at least one user on a single device, such as device 120, but the data is then made available on alternative devices within the same network. The biometric data can be transmitted directly between devices or it can be transmitted to a server 140 and then delivered to other devices in the network. However, through specific approaches disclosed herein, the data is never available in unencrypted form on server 140 and server 140 is never in possession of a key for decrypting the encrypted biometric data. Therefore, the biometric data can be used to obtain access to multiple device on the network without the user needing to conduct a time consuming biometric training procedure on more than one device. After training a single device there is a seamless integration of the biometric data across multiple devices without the need to train each subsequent device.

The biometric information can include fingerprint data, hand size data, retina data, iris data, facial recognition data, vocal signature data, or any other kind of biometric information. The devices can be any kind of electronic device for which a specific set of users are granted access. Devices 110, 120, and 130 can be a network of devices that are administrated by a single entity such as an employer of users 101, 102, and 103. This single entity can be referred to as the network owner. As mentioned previously, a third party can also be responsible for the operation of server 140. This third party can be referred to as the network administrator.

In specific approaches, biometric information is stored on server 140 in an encrypted format while the actual verification of the stored biometric information against a sample of biometric data provided by a user is performed at the device. The stored biometric information used in the verification process (e.g., the data that represents a fingerprint provided during an initial enrollment process) can be referred to as the reference biometric information. The sample biometric information provided when a user is requesting access (e.g., the data that represents a fingerprint provided by the user during a subsequent verification procedure) can be referred to as the sample biometric information. The verification process can be conducted on a secured portion of the device that is isolated from the other functionality of the device such that neither the sampled biometric information nor the reference biometric information are ever exposed to the general operating system of the device itself in unencrypted form.

In one embodiment, a computer-implemented method for onboarding a first biometrically secured point of sale device to a network is disclosed. The method comprises generating, using a secure execution environment on the first biometrically secured point of sale device, an asymmetric key pair. The asymmetric key pair includes a private key and a public key. The method also comprises transmitting the public key to a second biometrically secured point of sale device. The method also comprises receiving an encrypted master encryption key from the second biometrically secured point of sale device. The encrypted master encryption key is a master encryption key that is encrypted with the public key. The method also comprises decrypting, using the secure execution environment and the private key, the encrypted master encryption key. The method also comprises receiving an encrypted set of biometric data. The encrypted set of biometric data is a set of biometric data that is encrypted with the master encryption key. The method also comprises storing the set of biometric data on a memory of the first biometrically secured point of sale device. The set of biometric data uniquely identifies at least two users that are registered to use both the first and second biometrically secured point of sale devices is provided.

In another embodiment, a system for administrating access to a set of at least two biometrically secured point of sale devices is disclosed. The system comprises a first biometrically secured point of sale device including a secure execution environment and a first memory storing instructions to generate an asymmetric key pair. The asymmetric key pair includes a private key and a public key. The system also comprises a second biometrically secured point of sale device including a second memory storing instructions to receive the public key from the first biometrically secured point of sale device and encrypt a master encryption key with the public key to produce an encrypted master encryption key. The system also comprises a server that stores an encrypted set of biometric data in a database. The encrypted set of biometric data is a set of biometric data that is encrypted with the master encryption key, and received from the second biometrically secured point of sale device. The first memory also stores instructions to decrypt the encrypted master encryption key using the private key, and decrypt the encrypted set of biometric data using the master encryption key. The set of biometric data uniquely identifies at least two users that are registered to use both the first and second biometrically secured point of sale devices.

In another embodiment, a non-transitory computer-readable medium storing instructions that are executable by a processor to perform a method is disclosed. The method comprises storing an encrypted set of biometric data in a database. The encrypted set of biometric data is encrypted with a master encryption key. The method also comprises receiving a public key from a first biometrically secured point of sale device. The method also comprises transmitting the public key to a second biometrically secured point of sale device. The method also comprises receiving an encrypted master encryption key from the second biometrically secured point of sale device. The encrypted master encryption key is the master encryption key as encrypted with the public key. The method also comprises transmitting the encrypted master encryption key to the first biometrically secured point of sale device. The method also comprises transmitting the encrypted set of biometric data to the first biometrically secured device. The set of biometric data uniquely identifies at least two users that are registered to use both the first and second biometrically secured point of sale devices.

In another embodiment, a non-transitory computer-readable medium storing instructions that are executable by a processor to perform a method is disclosed. The method comprises generating an asymmetric key pair. The asymmetric key pair includes a private key and a public key. The method also comprises transferring the public key to a buffer for transmission to a second biometrically secured point of sale device. The method also comprises receiving an encrypted master encryption key from the second biometrically secured point of sale device. The encrypted master encryption key is a master encryption key that is encrypted with the public key. The method also comprises decrypting, using the private key, the encrypted master encryption key. The method also comprises receiving an encrypted set of biometric data. The encrypted set of biometric data is a set of biometric data that is encrypted with the master encryption key. The method also comprises storing the set of biometric data on a memory. The set of biometric data uniquely identifies at least two users that are registered to use both the first and second biometrically secured point of sale devices.

The disclosed approaches improve the fields of electronic access control and computerized user verification by providing enhancements in terms of both convenience and added privacy protection as compared to prior approaches. Achieving the efficient provisioning of biometric information to a network of devices without providing the biometric information in unencrypted form or a key for that encryption to a centralized server on the network is a technical problem. The disclosed approaches include a set of aspects that contribute to a solution to that technical problem. In particular, the specific onboarding and access administration approaches described above are technical solutions that transmit, encrypt, and process information among the various nodes of the network in an inventive manner to solve the aforementioned technical problem. Each of the disclosed approaches described above involving onboarding a first biometrically secured device can include providing access to the first biometrically secured device by comparing sample biometric data from a user to reference biometric data provided by that same user on the second biometrically secured device.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
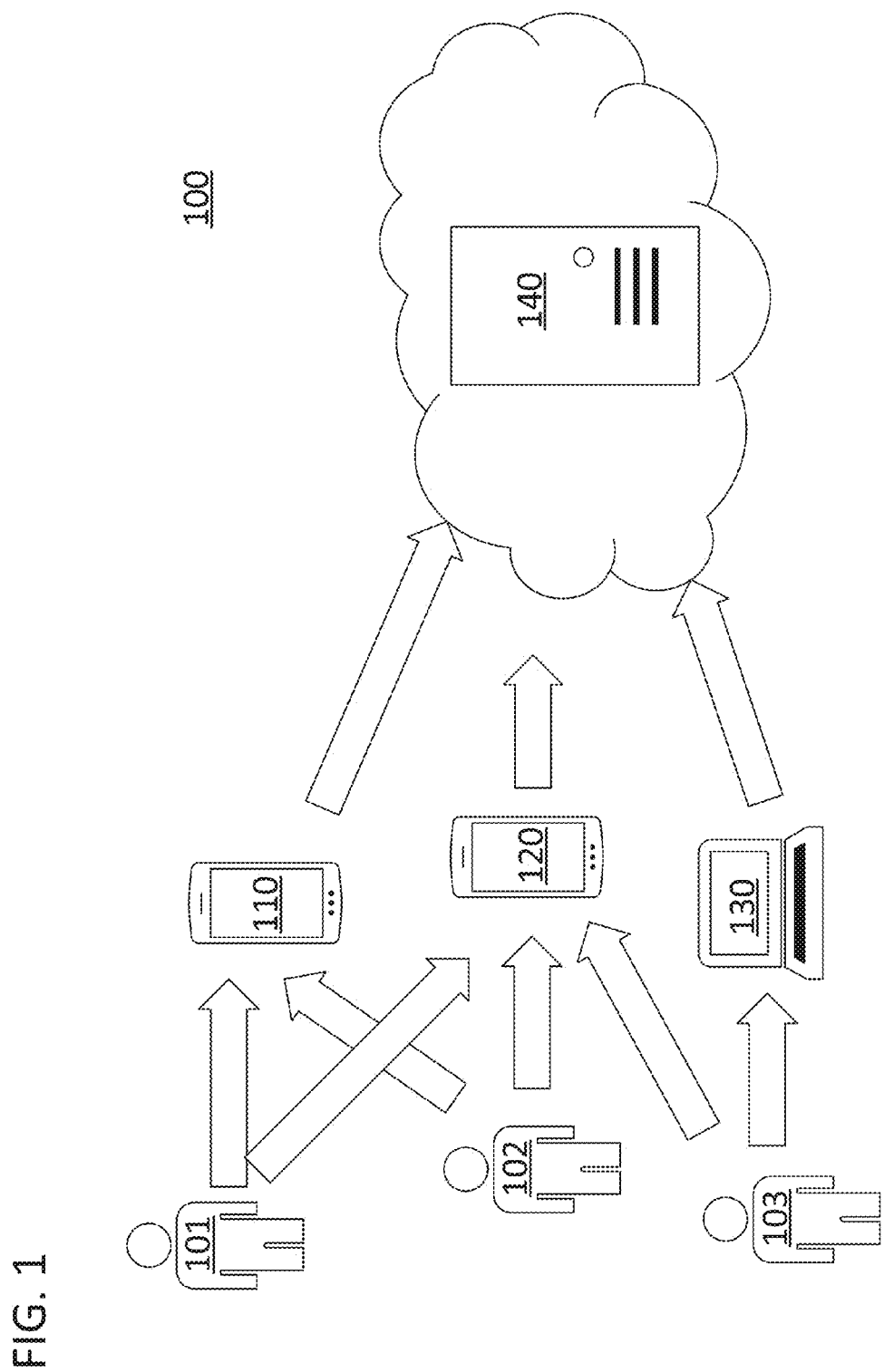
FIG. 1 illustrates a multiuser network of secured devices in accordance with related art.
Figure 2:
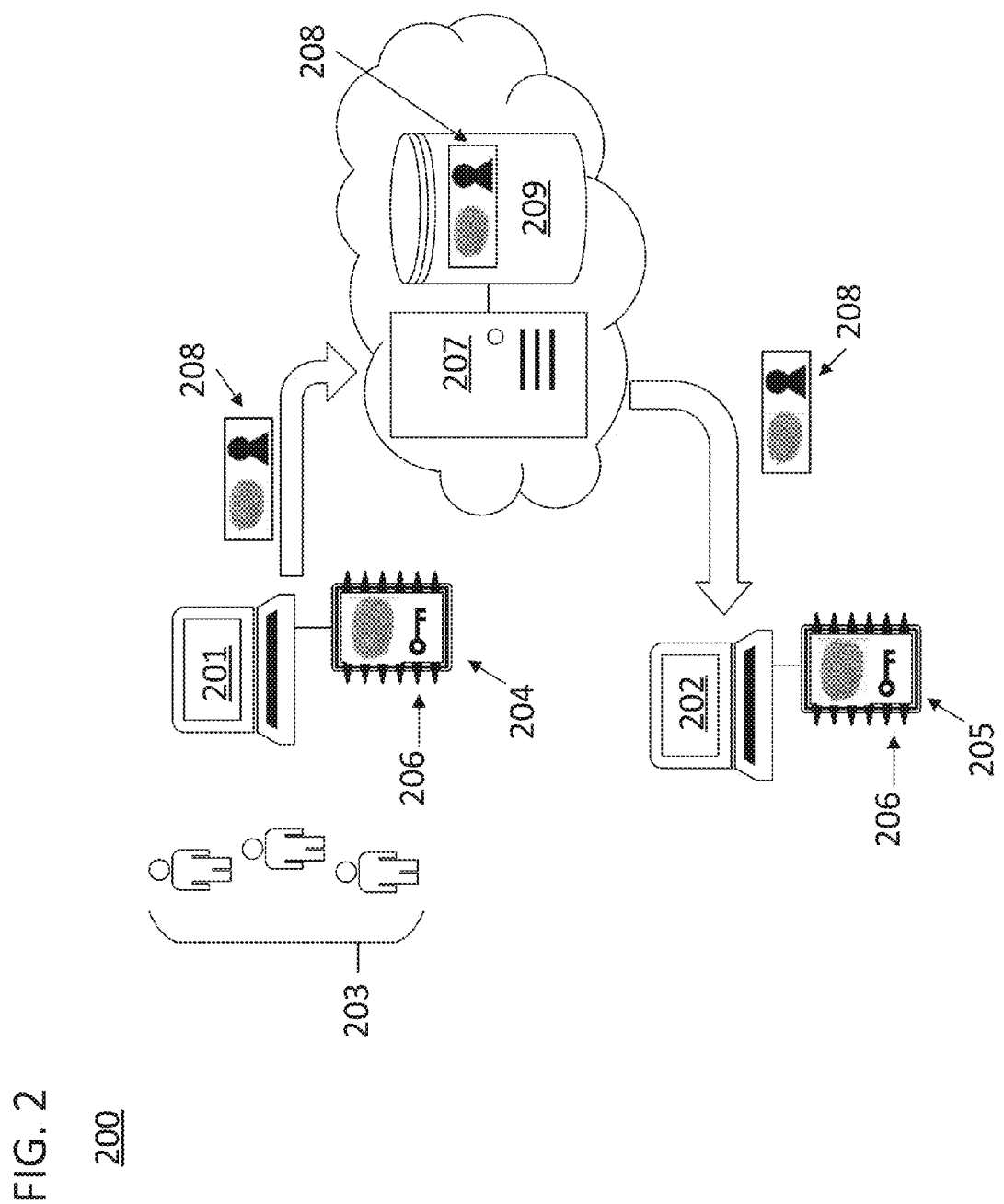
FIG. 2 illustrates a block diagram of a network of two biometrically secured devices in accordance with certain approaches disclosed herein.

FIG. 2 illustrates a block diagram of a network 200 with two biometrically secured devices 201 and 202. Network 200 is configured to allow a user to register biometric information with device 201 and then log into either device 201 or 202 interchangeably without having to separately register with device 202. Also, devices 201 and 202 can be interchangeably operated by any user in group 203 after those users have verified their identity with the device (i.e., the devices are multiuser devices). For example, devices 201 and 202 could be provided by an employer to its employees to be used interchangeably by the employees during their respective shifts. The devices could be POS terminals or any other work related devices such as a time card machine, specialized tablet, or employee access verification system. The devices could alternatively be identity verification devices or communal devices used in public spaces such as turnstiles in a public transportation setting.

Devices 201 and 202 include respective secure execution environments 204 and 205. Although secure execution environments 204 and 205 are illustrated as standalone integrated circuits, they can be standalone hardware units or instantiated as secured privileged modes on the main processors of devices 201 and 202. The execution environments may be capable of administrating an enrollment procedure at the device in which reference biometric information is obtained from a user. Not all of the devices in any given network 200 need to be capable of enrolling a user, and the benefits described herein will still be applicable. For example, network 200 can include specialized enrollment devices that are configured to obtain reference biometric information efficiently while other devices in the network are only capable of obtaining sample biometric information for a verification procedure. The enrollment procedure can include a training procedure in which a user provides multiple samples of biometric information to the device. For example, the user can provide multiple vocal samples in response to prompts offered by the device or multiple fingerprint scans provided to a fingerprint reader on the device. The biometric data provided by the user will then be stored as the reference biometric data for that user on the device itself. A unit of biometric data that is computer-readable and capable of serving as the sample or reference biometric information can be referred to as a biometric data element. In certain approaches, the secure execution environment will store the reference data in a secure memory that is only addressable by the secure execution environment. A specific approach for the secure execution environment is described below with reference to FIG. 3.

Once a user in group 203 completes an enrollment procedure on device 201, the reference biometric data stored in secure execution environment 204 can be used during an identity verification procedure when the user returns to device 201 at a later time. The identity verification procedure can also be conducted on secure execution environment 204. However, the same user can also conduct the identity verification procedure on device 202 without having to conduct a new enrollment procedure on device 202. Through the approaches described below, both device 201 and 202 will have access to a master encryption key 206 that is used to encrypt and decrypt the reference biometric data. However, server 207 will never have access to master encryption key 206. Therefore, the encrypted reference biometric data 208 can be transmitted from device 201 to server 207, stored in database 209, and delivered to device 202 without server 207 ever having access to the biometric data in unencrypted form, or the means to decrypt the biometric data.

Server 207 can be any system of software and suitable computer hardware that is capable of responding to requests across a network to provide a network service. Although, server 207 is illustrated as a single unit of physical hardware, server 207 may comprise multiple physical hardware units. The physical hardware units can include personal computers, workstations, and dedicated enterprise server blades. The physical hardware units can be in a single physical location such as an office or data center, but they may also be located at separate data centers or offices. The server 207 can be a virtualized server. Individual network services can be provided by individual servers or multiple servers, as well as individual units of physical hardware or multiple units of physical hardware. The server can be an on-premises web server utilized by a single network owner. However, the server can also be an off-premises web server located at a data center and administrated by a network administrator for the benefit of a single network owner or multiple network owners.

Figure 3:
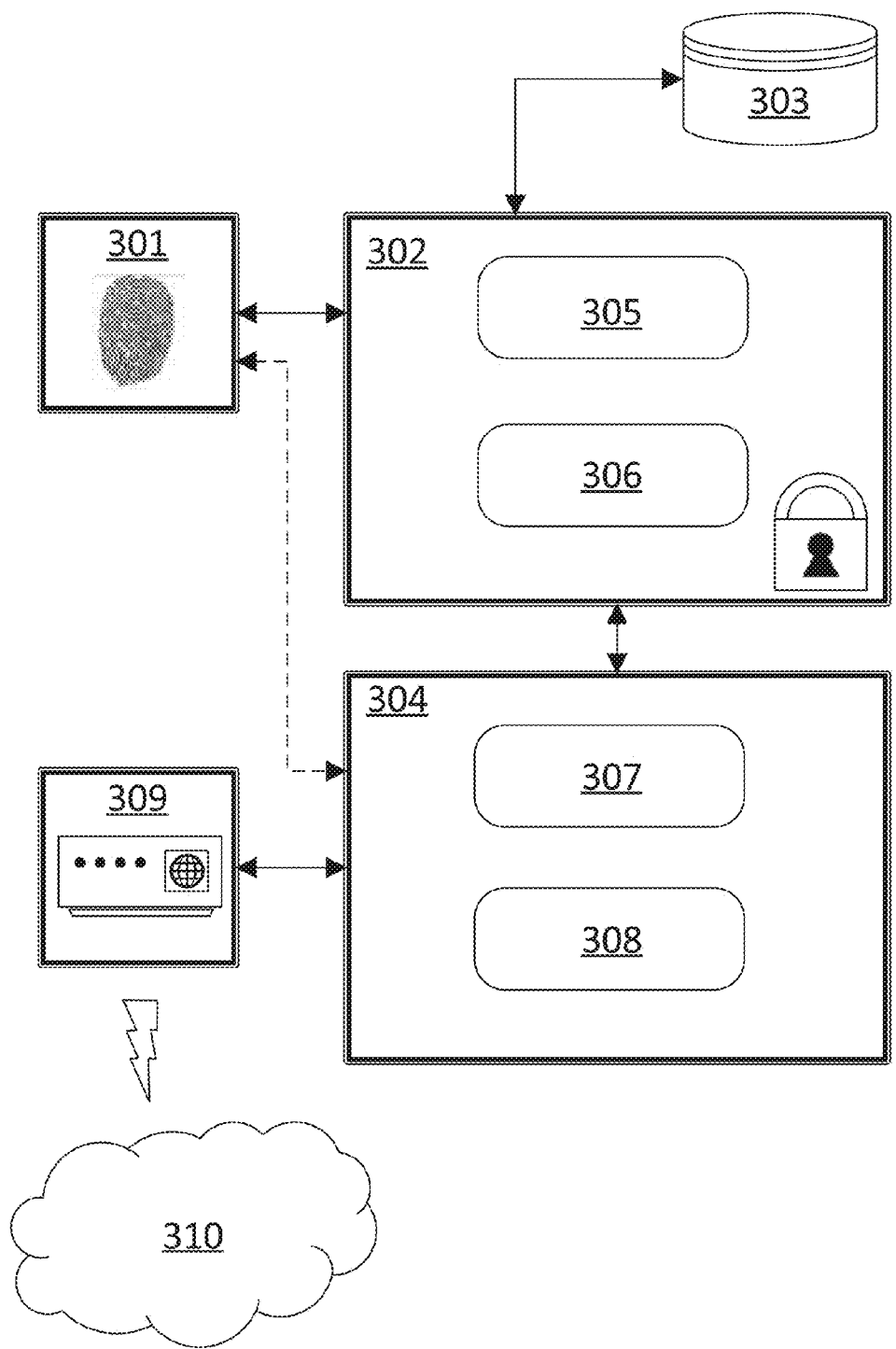
FIG. 3 illustrates a block diagram of an exemplary architecture for the biometrically secured devices in FIG. 2.

An exemplary architecture 300 for devices 201 and 202 is illustrated in FIG. 3. As mentioned previously, devices 201 and 202 do not need to be homogenous and indeed certain benefits accrue to approaches in which one of the devices is capable of conducting a specialized rapid enrollment procedure. For example, one device in the network could have a more accurate biometric sampling peripheral that is more conducive to obtaining sample biometric information. However, each device in the network should be capable of conducting a verification procedure. For example, device 202 should be able to compare sample biometric information obtained at device 202 with reference biometric information obtained at device 201. Sample biometric data can be obtained by a peripheral, which may be an integrated peripheral such as a touch screen built into the device. The data from the peripheral can be routed to a controller 301. The controller can be a dedicated interface for operating the peripheral. For example, if the peripheral were a touch screen, the controller could be a stand-alone touch controller integrated circuit. In certain approaches, the controller 301 will have a direct connection to a secure execution environment 302.

The direct connection between controller 301 and secure execution environment 302 can be a variable connection. As such, the same peripheral can be used to obtain sample biometric information as well as operate the device. Any user interface that can be used to both provide commands and obtain biometric data can be utilized for these purposes. For example, a touch screen can be used to obtain fingerprint data for direct delivery to the secure execution environment, but can also be used to send user commands to the general operating system. As another example, a camera used in gesture recognition can also obtain an image of a user's face to obtain facial recognition biometric data. As another example, a microphone for obtaining voice commands could be used to obtain vocal biometric data. The phantom line between controller 301 and standard execution environment 304 is provided to illustrate this concept. However, in other approaches controller 301 may have a dedicated connection to both execution environments. In still further approaches, controller 301 and indeed the peripheral itself may be used exclusively by the secured execution environment such as a workstation with a fingerprint reader that is used solely for biometric registration and verification.

Secure execution environment 302 can carry out the biometric comparison and biometric information management procedures for the overall service. Secure execution environment 302 may include a secure memory 303 that is only addressable by the secure execution environment. Secure execution environment 302 may also be instantiated using a dedicated secure processor located on the device. A separate standard execution environment 304 on the device will be responsible for instantiating the operating system for the device. The standard execution environment 304 could be instantiated by a separate standard processor located on the device. As non-limiting examples, the operating system could be an iOS or Android operating system. The secure execution environment 302 will operate on a higher level of privilege than the standard execution environment 304, thus providing greater data security and integrity to the secure execution environment. In certain approaches, secure execution environment 302 and standard execution environment 304 could be instantiated on the same processor. In these approaches, secure execution environment 302 could be a privileged execution mode on the main processor of the device. The secure memory 303 can be used to store the reference biometric information for users that have been enrolled with the overall network. In certain approaches, the secure memory 303 will only be addressable by the secure processor and will not be addressable by the standard processor. Secure execution environment 302 can include another alternative memory to store instructions for executing the functionality of the secure execution environment. This memory could be secure memory 303 or an alternative memory which could be nonvolatile memory that is also only addressable by secure execution environment 302 or that otherwise stores instructions that are only executable by secure execution environment 302.

Secure execution environment 302 may include a matching engine 305 and a user management component 306. The matching engine 305 and user management component 306 may be instantiated by the secure processor and alternative memory mentioned above. The matching engine 305 will conduct a comparison of the reference and sample biometric information for a particular user during a verification procedure. The matching engine 305 can utilize a fuzzy logic algorithm to conduct the comparison. The user management component 306 will administrate the storage and acquisition of biometric information for particular users in the secure execution environment 302.

User management component 306 could be configured to administrate the process of obtaining reference biometric data for a new user by controlling prompts to the user on the device and receiving biometric data via controller 301. User management component 306 could be configured to receive additional reference biometric data from the server, determine if the associated user was already registered by secure execution environment 302, and store or discard the additional reference biometric data based on that comparison. User management component 306 could also push newly obtained reference biometric data up to a server so that it is available to the network as a whole or respond to intermittent or periodic requests from the server for newly obtained reference biometric data. To facilitate these processes, the biometric data could be stored with a corresponding identifier for the particular user which could comprise a string of data such as a user name or arbitrary number identifying the user internally to the secured execution environments on a given network. During a registration procedure, the user management component 306 could create this string which may involve a communication with the server to assure that a given user identifier was available for use on the network.

Standard execution environment 304 can include a processor and a memory for instantiating the operating system of the overall device. Standard execution environment 304 may include a login engine 307 and a network engine 308. The login engine 307 and network engine 308 may be instantiated by the processor and memory of standard execution environment 304.

Login engine 307 can function in combination with user management component 306 to administrate the enrollment procedure for a new user or the verification procedure for a returning user. The degree to which these separate modules participate in these procedures can vary. In one situation login engine 307 merely monitors the state of the overall operating system to determine when an enrollment or verification procedure has been triggered and indicates this fact to management component 306 to conduct the bulk of the procedures. Regardless of how the functions are split between the two components, the biometric data will not be accessible to login engine 307 in unencrypted form.

Network engine 308 can likewise function in combination with user management component 306 to administrate communication between the device and server 310 via network adapter 309. Networking engine 308 will transfer encrypted data to and from server 310 via network adapter 309. In particular, user management component 306 and networking engine 308 can intermittently, or periodically, send a request to poll server 310 to pull the biometric data for newly registered users that registered on other devices from the server 310, or push the biometric data for newly registered users that registered on the device to the server 310. User management component 306 and networking engine 308 can also intermittently, or periodically, receive requests from server 310 to accept biometric data for newly registered users that registered on other devices from server 310, or transmit the biometric data for newly registered users that registered on the device to server 310.

Figure 4:
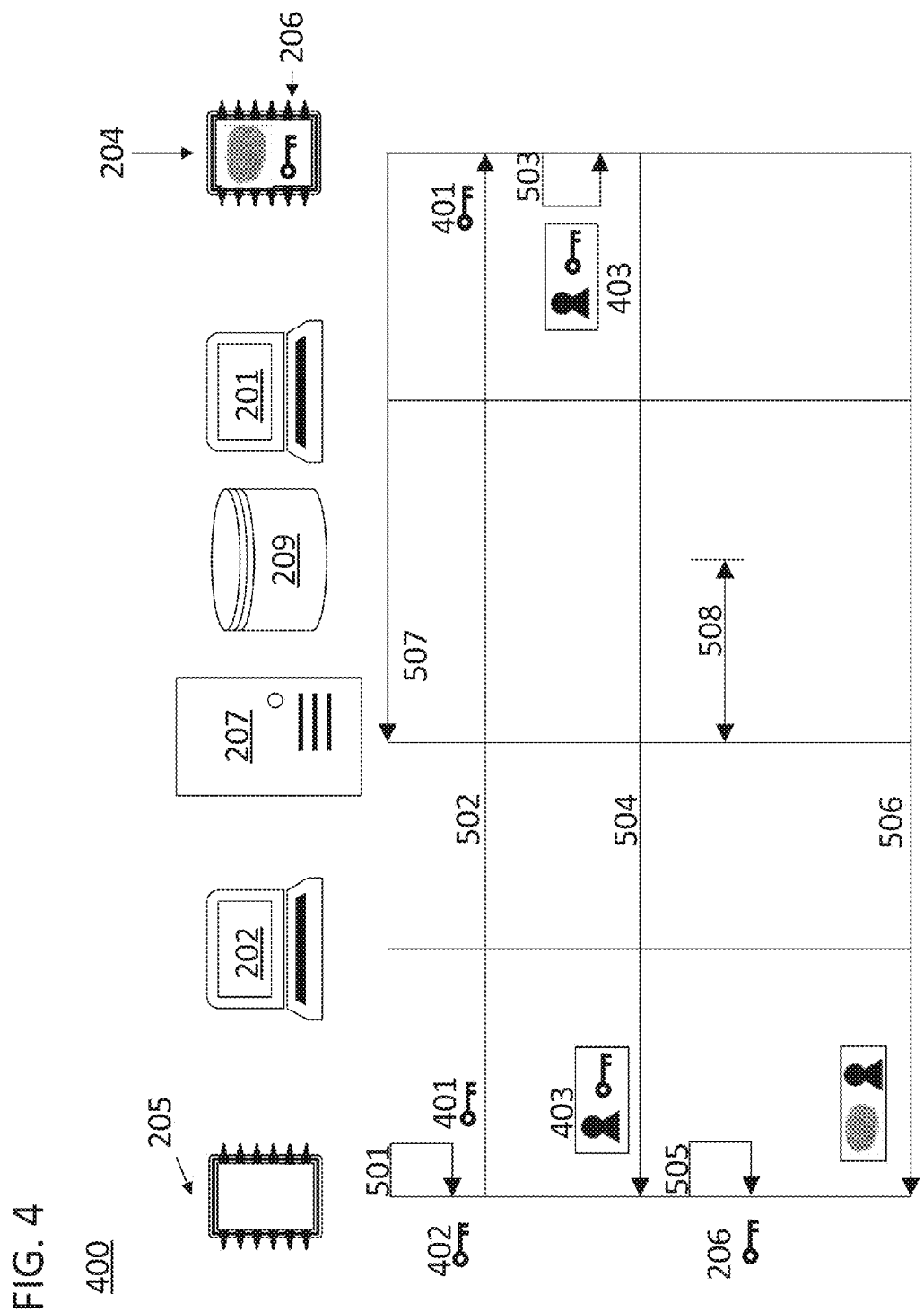
FIG. 4 illustrates a ladder diagram for a set of methods for onboarding a first biometrically secured electronic device to a network in accordance with certain approaches disclosed herein.
Figure 5:
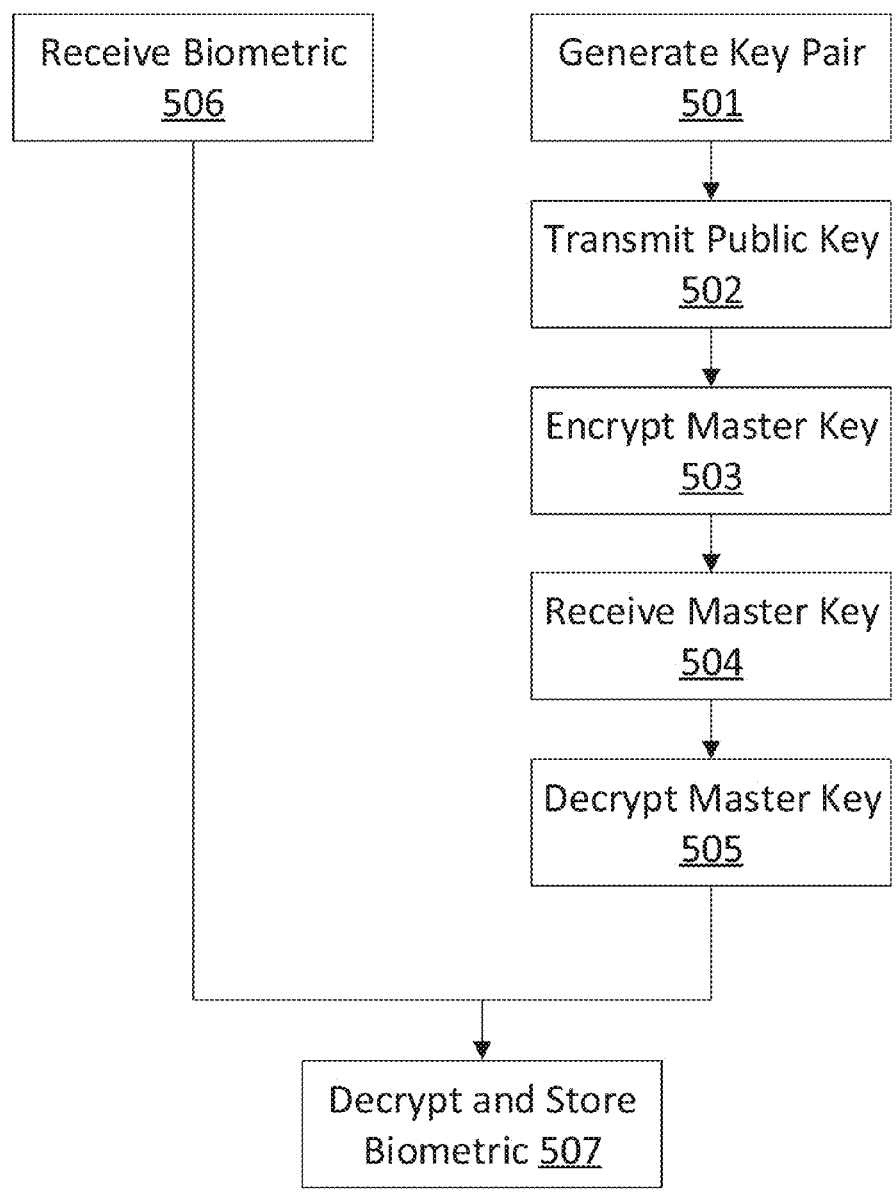
FIG. 5 illustrates a flow chart for a set of methods for onboarding a first biometrically secured electronic device to a network in accordance with certain approaches disclosed herein.

FIGS. 4 and 5 illustrate a ladder diagram 400 and flow chart 500 for a set of computer-implemented methods for onboarding a first biometrically secured electronic device to a network. Each of the nodes in the ladder diagram can store instructions to execute the steps associated with those nodes using a processor and a memory. The network can comprise devices 201 and 202 including secure execution environments 204 and 205. Devices 201 and 202 can communicate directly or through a server such as server 207. As illustrated, device 202 is being on-boarded to the network. Device 202 can be a newly purchased device that an employer or other network owner would like added to their system. As a result, device 202 does not include any stored biometric information and does not include an encryption key. As illustrated, device 201 is already part of the network and includes a master encryption key and set of biometric reference data stored on secured execution environment 204. The initial onboarding process for device 201 is discussed later in FIGS. 7 and 8. However, for purposes of a discussion of ladder diagram 400 it can be noted that neither the biometric information nor the master encryption key were provided to device 201 from the network. The biometric information on device 201 was input to the device directly or was transmitted to device 201 through the same procedure that is about to be described with reference to device 202. The master encryption key itself can be generated on device 201 itself. This key generation process can be conducted after the device has been placed into service so that the key is not available even to the network administrator or manufacturer of the device.

In step 501, a secure processor on device 202 is used to generate an asymmetric key pair including a private key 402 and a public key 401. The asymmetric key pair can be generated using RSA, Diffie-Hellman, ElGamal, ECC, or any other asymmetric encryption algorithm. The generation procedure can be conducted solely within a secure execution environment such as the one described with reference to FIG. 3. As such, the private key will never be accessible to the network or the operating system of the device itself.

In step 502, the public key 401 generated in step 502 is transmitted to device 201. The step can include transferring the public key to a buffer on device 202. This transmission can be conducted via direct communication between the devices. As illustrated, the communication takes place via the network controller of devices 201 and 202, and server 207. Those of ordinary skill in the art will recognize that a public key can be used to encrypt information, but that only the private key of an asymmetric key pair can decrypt information generated using the public key. In step 503, the public key 401 delivered to device 201 is utilized to encrypt master encryption key 206. This encryption procedure can be conducted entirely within secure execution environment 204.

In step 504, device 202 receives the encrypted master encryption key 403 from device 201. Encrypted master encryption key 403 is the master encryption key 206 as encrypted with public key 401. Although encrypted master encryption key 403 is in some approaches transmitted via server 207, the server 207 does not have access to the master encryption key 206 because it has been encrypted by public key 401 and can therefore only be decrypted by private key 402.

In step 505, encrypted master encryption key 403 is decrypted using private key 402 and the secure processor of device 202. In certain approaches, the decrypting will take place entirely within the secure execution environment 205 of device 202. As a result, the master encryption key 206 can be stored within a secure memory of device 202 without having been available to server 207 or the outside network generally.

In step 506, an encrypted set of biometric data is received at device 202. The encrypted biometric data can be received from server 207 after being pulled from a database 209 or after being sent from device 201. In other approaches the encrypted biometric data can be provided directly from device 201 to device 202. In either case, the set of biometric information will first be encrypted using the master encryption key 206 at device 201. The encrypted biometric data will then either be transmitted to server 207 for storage in database 209 and subsequent transmission to device 202, or transmitted immediately to device 202 after being encrypted.

In step 507, the set of biometric data is decrypted and stored on a memory of device 202. The memory can be a secure memory of secure execution environment 205. The step could consist essentially of writing the set of biometric data to the secure memory using the secure processor. The biometric data that is received in step 506 can be decrypted within the secure execution environment using master encryption key 206. The set of biometric data can correspond to one or more users. The set of biometric data can uniquely identify at least two users that are registered to operate both devices 201 and 202. The users can be users that registered using an enrollment process on device 201 or another device that transmitted the biometric information it collected to device 201 using a similar procedure to that described with reference to FIGS. 4 and 5. The network owner and network administrator will be able to coordinate the execution of the methods described with reference to FIG. 5 such that a user that conducts an enrollment process on device 201 will subsequently be registered to operate both devices 201 and 202.

After device 202 decrypts and stores the set of biometric data, a user that initially enrolled with the network via a registration process on a different device can seamlessly conduct an identity verification process on device 202. The verification process will comprise receiving, at device 202, a biometric login request. The biometric login request can be as simple as a user picking up a device with an integrated fingerprint scanning system such that the login request is conducted in an innocuous manner. Alternatively, the biometric login request can be more involved and require a user to identify themselves using non-biometric means such as a user name prior to biometric information being obtained from the user. The verification process will also comprise comparing, using a secured processor, data from the biometric login request with data from stored on the device in step 507. The comparison can be conducted using the matching engine 305 operating on the data from the biometric login request and the data stored in step 507 as the reference biometric data. The verification process will also include authorizing access to the device based on the outcome of the comparison step. Access to the device can include being able to obtain access to information or functionality locked behind an electronic barrier that is controlled by the device, such as an operating system instantiated by the standard processor, or being allowed to pass through a physical barrier that is controlled by the device.

The network 200 can take on various forms. The network can include the Internet. The network can be a closed loop proprietary network that does not have any external connection on which server 207 is the central server. The nodes of the network can be connected using multiple networking technologies such as wired and wireless networks of varying protocols. In particular, if direct transmission is utilized to transfer information from device 201 to device 202, the network can utilize Bluetooth, Zigbee, WiFi, or some other wireless standard to transmit information. Direct transmission may require the devices to be placed in close proximity as one device is added to the network.

With reference to ladder diagram 400 in FIG. 4, the specific operation of the server and network adapters on the devices was left out of the methods of flow chart 500. However, if a particular network did utilize a server such as server 207, communication from one secure environment to the other would involve a receipt and transmission of information at each rung of ladder diagram 400. For example, a separate step 507 of receiving at the server the encrypted set of biometric data from device 204 could precede all of the steps in both FIGS. 4 and 5. The data could then be stored and retrieved to and from database 509 as shown by step 508 in FIG. 4. The encrypted master encryption key could likewise be stored in database 209 using a similar approach. In these approaches, step 506 could be limited to a transmission from server 207 to device 205. In addition, steps 502 and 504 would each involve substeps of receiving data and transmitting that data from the server.

Utilization of server 207 provides certain benefits in that the central server can administrate the synchronization of biometric information for a set of users across the network as they are received from multiple devices. As mentioned previously with reference to the network adapter of FIG. 3, the devices can operate in combination with the server to push and pull new biometric data to and from the servers and devices to assure that all of the devices are kept up to date. This approach can prevent a user from having to conduct a training procedure at one device even though they have already been registered on the network by conducting an enrollment procedure at one of the other devices on the network. In these approaches, new biometric data elements that are received on a device, such as device 202, will be encrypted on the secured execution environment of the device, and then transmitted to the server for storage on database 209. Also, since the devices may be located at different physical locations such as multiple stores or offices of a single enterprise, a server may be necessary to transmit the encrypted biometric information across the network. Furthermore, devices might not be activated at the same time of day so the biometric information that they store might not be available for synchronization with other devices unless they are administrated and stored at a central location that is more generally available.

Figure 6:
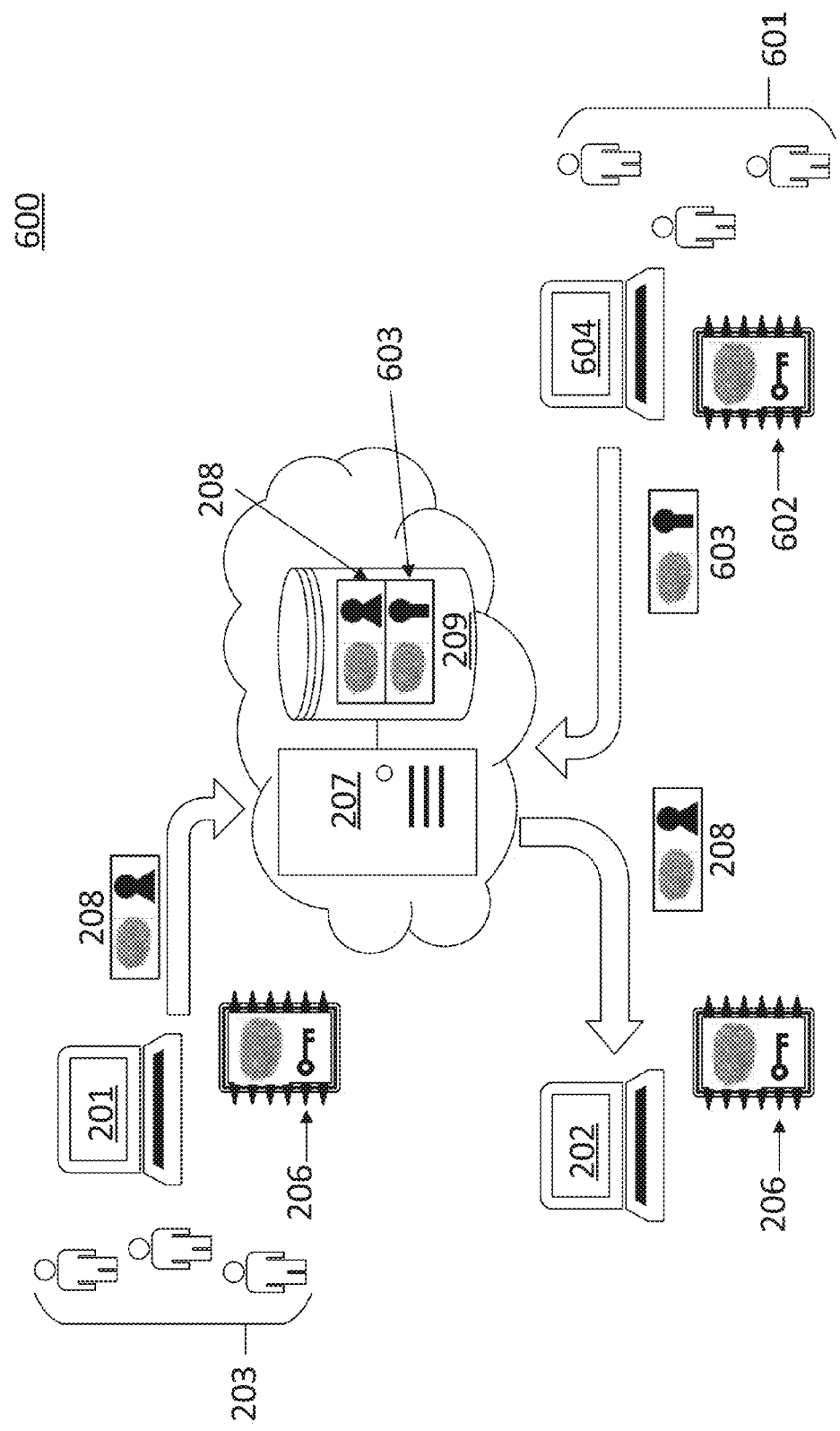
FIG. 6 illustrates a block diagram of two networks of biometrically secured devices in accordance with certain approaches disclosed herein.

From a system perspective, another benefit of storing the biometric information at a central server in an encrypted format is that the same server can administrate the storage and delivery of biometric information for multiple sets of networks. With reference to system 600 in FIG. 6, server 207 can administrate a network for set of users 203 and set of users 601. The sets of users 203 and 601 may be employees or members of different network owners while server 207 is operated by a single network operator. For example, server 207 could be operated by the purveyor of a POS system while user sets 203 and 601 could be sets of employees associated with different merchants that utilize that POS system. Since the sets of biometric information are encrypted using separate master encryption keys 206 and 602, the same server can store encrypted biometric information 603 obtained via device 604 and encrypted biometric data 208 obtained from device 201. The methods described with reference to FIGS. 4 and 5 could then be repeated for another device that user set 601 would thereby be registered to access.

Sets of encrypted biometric data stored in database 209 could be stored in association with different merchant identifiers. The merchant identifiers could uniquely identify owners of the various individual devices on any given network. In addition to storing the data with a merchant identifier, a unique key pair could be set up during the initial registration of a network with the central server to ensure that only those devices which belong to a given network are able to access the stored biometric information—even in encrypted form. This process is also beneficial if the network transmits information through public networks such as the Internet to assure that communications on the network are kept secure.

Figure 7:
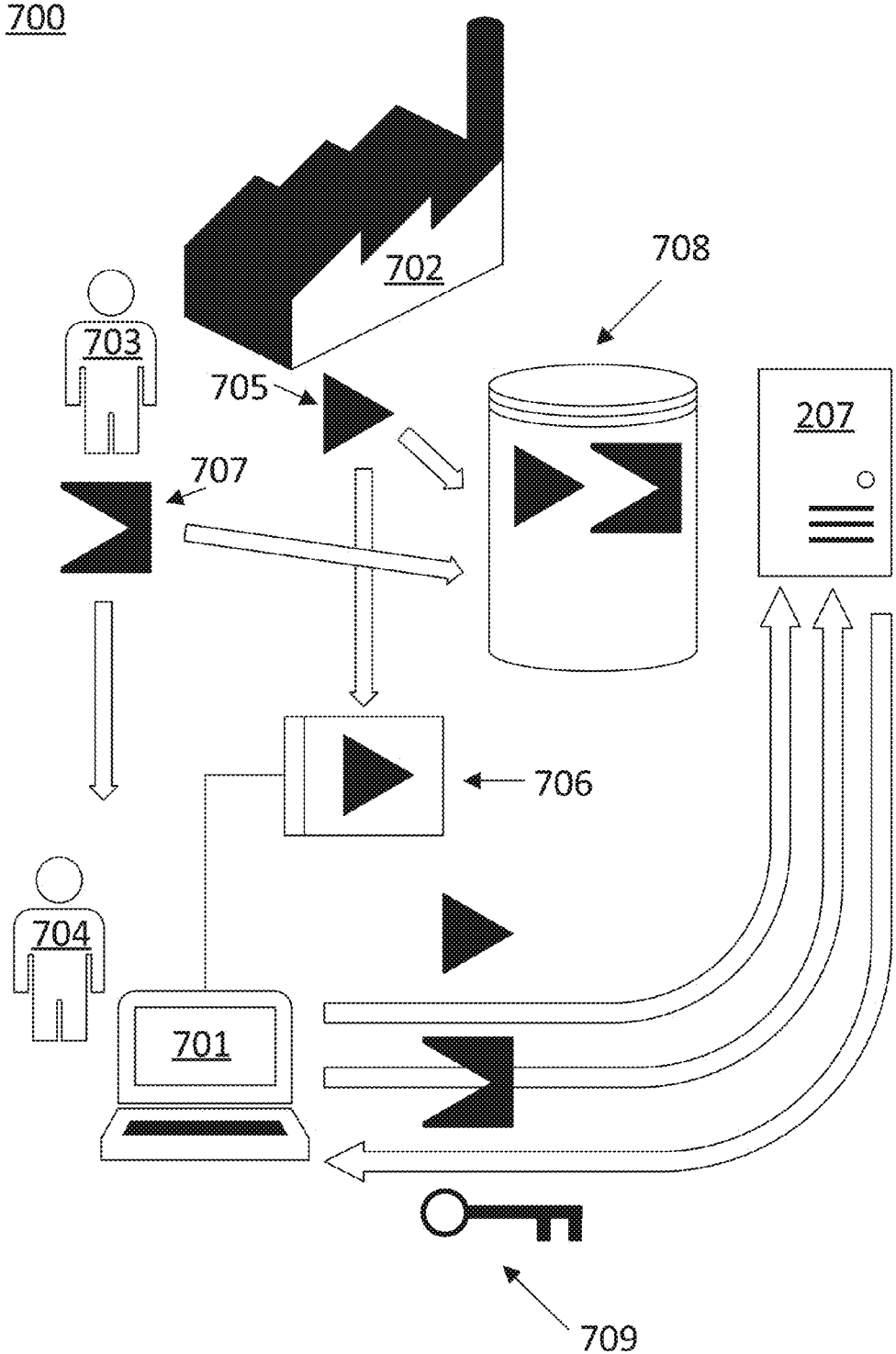
FIG. 7 illustrates a block diagram of a system for conducting an initial enrollment procedure in accordance with certain approaches disclosed herein.
Figure 8:
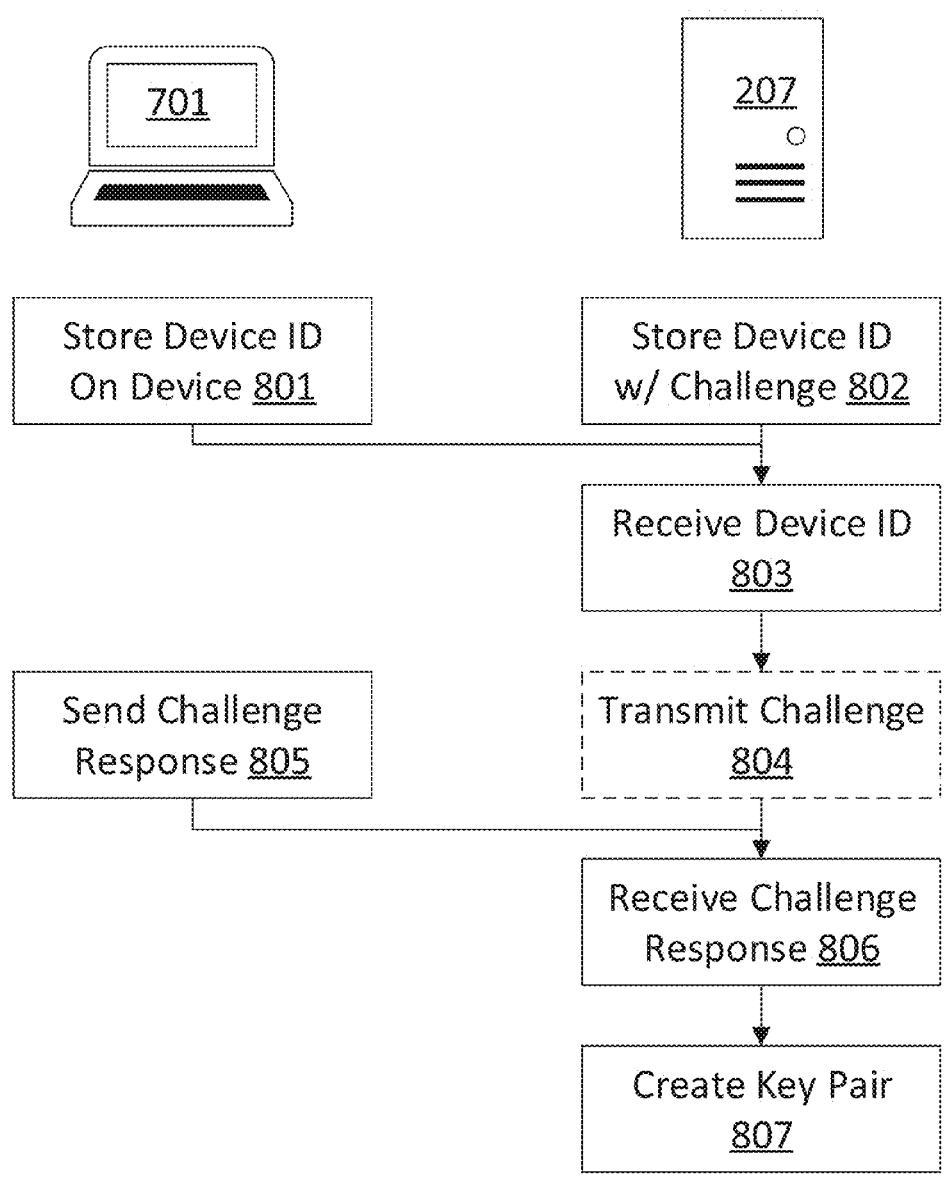
FIG. 8 illustrates a block diagram of a flow chart for conducting an initial enrollment procedure in accordance with certain approaches disclosed herein.

An initial enrollment procedure for any given device and network can be described with reference to the block diagram of system 700 in FIG. 7 and the methods illustrated by flow chart 800 in FIG. 8. Device 701 and server 207 in block diagram 700 can each store instructions to execute the steps associated with those nodes using a processor and a memory. Device 701 is manufactured at factory 702 and sold by network administrator 703 to purchaser 704. Device 701 could be any of the devices mentioned above with respect to device 201. In particular, device 701 could be a POS terminal and purchaser 704 could be a merchant interested in operating that POS terminal at their place of business. In the methods illustrated by flow chart 800, information is distributed between purchaser 704, device 701 itself, and server 207 in order to assure that the device is properly enrolled on the network in a secure fashion.

In step 801, a device identifier 705 is stored on device 701 as it is produced at factory 702. The device identifier can be stored on nonvolatile memory 706 of device 701. In certain approaches, the device identifier will not be readily determinable from the exterior of the device, and might not be accessible to any direct interface with device 701 without accessing the information via server 207. For example, nonvolatile memory 706 may only be accessible to a secure execution environment 302 on device 701 in combination with server 207. The identifier may be an injected code burned into the device as it is moving through a manufacturing line.

In step 802, device identifier 705 is stored along with an owner challenge response 707 in a database 708. The information in database 708 will be accessible to server 207. Device identifier 705 can be provided to database 708 separately from owner challenge response 707. As such, factory 702 will not necessarily have access to both the device identifier and the owner challenge response. Owner challenge response 707 can be provided to purchaser 704 via any private communication channel between network administrator 703 and purchaser 704. Although block diagram 700 is shown with the owner challenge response originating with network administrator 703, the owner could initially select the owner challenge response. Owner challenge response 707 could be as simple as a text string representing a corporate name of purchaser 704, could be a password, or could be data embedded on a specialized fob used to initialize device 701.

In step 803, device identifier 705 is received at server 207 from device 701. The device identifier 705 can be transmitted by the device 701 to server 207 as soon as the device is put into operation and connected to a network. Upon receiving device identifier 705, server 207 can conduct step 804 and transmit an owner challenge to device 701. The transmission of an owner challenge from server 207 to device 701 in step 804 is optional so it is illustrated using dotted lines in FIG. 8. The transmitted challenge could be a customized challenge specifically intended for a particular purchaser and could be stored in association with the device identifier at server 207. However, the challenge could also be a generic challenge such as a password request or other call for information. Step 804 is optional because device 701 could include a prompt for the owner challenge information as part of its initial setup routine. For example, device 701 could automatically prompt a user for a password as soon as it has completed transmitting the device identifier to the server.

In step 806, the owner challenge response is received from device 701 at server 207. The challenge response can be transmitted from device 701 in step 805. Upon receiving the owner challenge response, server 207 will compare the response with the value initially provided to database 708. If the owner challenge response matches the stored value, server 207 will conduct step 807 in which a key pair is generated for communication between server 207 and device 701. The key pair can be generated using RSA or other similar encryption algorithm. The generated key 709 can be transmitted to device 701. After server 207 and device 701 establish a secure communication channel, device 701 can internally generate a master encryption key and begin receiving user biometric information to be stored on the device, encrypted, and potentially transmitted up to server 207 for storage in the cloud. Subsequently, as additional devices are brought online by purchaser 704, server 207 will be able to use the same procedure to authorize those additional devices to operate on the same network as device 701 which will provide the additional devices with access to the encrypted biometric data and master encryption key stored on device 701 in accordance with the methods described above with reference to FIGS. 4 and 5.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The biometric information can be a mix of more than one type of biometrically sampled data such as a combination of both voice and facial recognition, and multiple devices on the network can be configured to sample or read a subset of those data types. These and other modifications and variations to the present invention may be practiced by those skilled in the art, without departing from the scope of the present invention, which is more particularly set forth in the appended claims.

What is claimed is:

1. A computer-implemented method for onboarding a third biometrically secured point of sale device to a network comprising:
   generating, using a secure execution environment on a first biometrically secured point of sale device, an asymmetric key pair, wherein the asymmetric key pair includes a private key and a public key;
   transmitting the public key to a second biometrically secured point of sale device;
   receiving an encrypted master encryption key from the second biometrically secured point of sale device, wherein the encrypted master encryption key is a master encryption key that is encrypted with the public key;
   decrypting, using the secure execution environment and the private key, the encrypted master encryption key;
   receiving an encrypted set of biometric data, wherein the encrypted set of biometric data is a set of biometric data that is encrypted with the master encryption key;
   storing the set of biometric data on a memory of the first biometrically secured point of sale device;
   receiving a second public key from a second asymmetric key pair, wherein the second asymmetric key pair includes a second private key and the second public key, and wherein the second asymmetric key pair is generated using a second secure execution environment on the third biometrically secured point of sale device;
   encrypting, using the secure execution environment and the second public key, the encrypted master encryption key;
   transmitting a second encrypted master encryption key to the third biometrically secured point of sale device, wherein the second encrypted master encryption key is the master encryption key that is encrypted with the second public key; and
   transmitting the encrypted set of biometric data to the third biometrically secured point of sale device, wherein the encrypted set of biometric data is a set of biometric data that is encrypted with the master encryption key;
   wherein the set of biometric data uniquely identifies at least two users that are registered to use the first, second and third biometrically secured point of sale devices.

2. The computer-implemented method from claim 1, further comprising:
   receiving, at the first biometrically secured point of sale device, a biometric login request;
   comparing, using the secure execution environment, data from the biometric login request with data from the set of biometric data; and
   authorizing access to the first biometrically secured point of sale device based on the comparison step;
   wherein the first biometrically secured point of sale device includes a standard execution environment for instantiating an operating system on the first biometrically secured point of sale device;
   wherein the storing step includes writing the set of biometric data to the memory using the secure execution environment; and
   wherein the memory is only addressable by the secure execution environment and is not addressable by the standard execution environment.

3. The computer-implemented method from claim 1, further comprising:
   storing, in a database, a device identifier in association with an owner challenge response;
   storing, in nonvolatile memory on the first biometrically secured point of sale device, the device identifier;
   receiving, at a server, the device identifier from the first biometrically secured point of sale device;
   receiving, at the server from the first biometrically secured point of sale device, the owner challenge response;
   receiving the owner challenge response from the first biometrically secured point of sale device; and
   creating a key pair for communication between the server and the first biometrically secured point of sale device after and in response to receiving the owner challenge response from the first biometrically secured point of sale device at the server.

4. The computer-implemented method from claim 1, further comprising:
receiving, at a server, the encrypted set of biometric data from the second biometrically secured point of sale device;
receiving, at the server, the public key from the first biometrically secured point of sale device;
transmitting, from the server, the public key to the second biometrically secured point of sale device;
receiving, at the server, the encrypted master encryption key from the second biometrically secured point of sale device;
transmitting, from the server, the encrypted master encryption key to the first biometrically secured point of sale device; and
transmitting, from the server, the encrypted set of biometric data to the first biometrically secured point of sale device.

5. The computer-implemented method from claim 4, further comprising:
storing, in a database and using the server, the encrypted set of biometric data after receiving the encrypted set of biometric data from the second biometrically secured point of sale device;
receiving, at the first biometrically secured point of sale device, a new biometric data element;
encrypting, using the secure execution environment and the master encryption key, the new biometric data element to form a new encrypted biometric data element,
transmitting, from the first biometrically secured point of sale device, the new encrypted biometric data element to the server; and
storing, in the database and using the server, the new encrypted biometric data element with the encrypted set of biometric data.

6. The computer-implemented method from claim 5, further comprising:
pushing, using the server, the new encrypted biometric data element to the second biometrically secured point of sale device.

7. The computer-implemented method from claim 5, wherein:
the new biometric data element is received via a touch screen on the first biometrically secured point of sale devices;
the encrypted set of biometric data is stored in the database in association with a merchant identifier; and
the merchant identifier uniquely identifies an owner of the first and second biometrically secured point of sale devices.

8. A system for administrating access to a set of at least three biometrically secured point of sale devices comprising:
a first biometrically secured point of sale device including a secure execution environment and a first memory storing instructions to generate an asymmetric key pair, wherein the asymmetric key pair includes a private key and a public key;
a second biometrically secured point of sale device including a second secure execution environment and a second memory storing instructions to: (i) generate a second asymmetric key pair, wherein the second asymmetric key pair includes a second private key and a second public key; (ii) receive the public key from the first biometrically secured point of sale device; and (iii) encrypt a first master encryption key with the public key to produce a first encrypted master encryption key;
a third biometrically secured point of sale device including a third memory storing instructions to: (i) receive the second public key from the second biometrically secured point of sale device; and (ii) encrypt the first master encryption key with the second public key to produce a second encrypted master encryption key; and
a server that stores an encrypted set of biometric data in a database, wherein the encrypted set of biometric data is: (i) a set of biometric data that is encrypted with the first master encryption key; and (ii) received from the third biometrically secured point of sale device;
wherein the first memory also stores instructions to: (i) decrypt the first encrypted master encryption key using the private key; and (ii) decrypt the encrypted set of biometric data using the first master encryption key;
wherein the second memory also stores instructions to: (i) decrypt the second encrypted master encryption key using the second private key; and (ii) decrypt the encrypted set of biometric data using the first master encryption key; and
wherein the set of biometric data uniquely identifies at least two users that are registered to use the first, second, and third biometrically secured point of sale devices.

9. The system from claim 8, further comprising:
a user interface located on the first biometrically secured point of sale device for receiving a biometric login request;
a standard execution environment located on the first biometrically secured point of sale device that instantiates an operating system on the first biometrically secured point of sale device; and
a secure memory located on the first biometrically secured point of sale device that stores the set of biometric data;
wherein the first memory also stores instructions to: (i) compare, using the secured execution environment, data from the biometric login request with data from the set of biometric data; and (ii) authorize access to the first biometrically secured point of sale device based on the comparison step; and
wherein the secure memory is only addressable by the secure execution environment and is not addressable by the standard execution environment.

10. The system from claim 8, further comprising:
a device identifier stored: (i) in the database in association with an owner challenge response; and (ii) in nonvolatile memory on the first biometrically secured point of sale device;
wherein the server stores instructions to create a key pair for communication between the server and the first biometrically secured point of sale device upon receiving the owner challenge response from the first biometrically secured point of sale device.

11. The system from claim 8, further comprising:
a user interface located on the first biometrically secured point of sale device for receiving a new biometric data element;
wherein the first memory stores instructions to encrypt the new biometric data element using the first master encryption key to form a new encrypted biometric data element; and
wherein the server stores instructions for storing the new encrypted biometric data element with the encrypted set of biometric data at the server.

12. The system from claim 11, wherein:
the server stores instructions for pushing the new encrypted biometric data element to the second biometrically secured point of sale device.

13. The system from claim 11, wherein:
the user interface is a touch screen;
the encrypted set of biometric data is stored in the database in association with a merchant identifier; and
the merchant identifier uniquely identifies an owner of the first and second biometrically secured point of sale devices.

14. The system from claim 13, further comprising:
a fourth biometrically secured point of sale device including a fourth memory storing a second set of biometric data and a second master encryption key;
wherein the server stores a second set of encrypted biometric data, wherein the second set of encrypted biometric data is encrypted with the second master encryption key;
wherein the first master encryption key cannot decrypt the second set of encrypted biometric data;
wherein the second set of encrypted biometric data is stored in the database in association with a second merchant identifier; and
wherein the second merchant identifier uniquely identifies an owner of the fourth biometrically secured point of sale device.

15. A non-transitory computer-readable medium storing instructions that are executable by a processor to perform a method comprising:
storing an encrypted set of biometric data in a database, wherein the encrypted set of biometric data is encrypted with a first master encryption key;
receiving a public key from a first biometrically secured point of sale device;
transmitting the public key to a second biometrically secured point of sale device;
receiving an encrypted master encryption key from the second biometrically secured point of sale device, wherein the encrypted master encryption key is the first master encryption key as encrypted with the public key;
transmitting the encrypted master encryption key to the first biometrically secured point of sale device;
transmitting the encrypted set of biometric data to the first biometrically secured point of sale device;
receiving a second public key from a third biometrically secured point of sale device;
transmitting the second public key to the first biometrically secured point of sale device;
receiving a second encrypted master encryption key from the first biometrically secured point of sale device, wherein the second encrypted master encryption key is the first master encryption key as encrypted with the second public key;
transmitting the second encrypted master encryption key to the third biometrically secured point of sale device; and
transmitting the encrypted set of biometric data to the third biometrically secured point of sale device;
wherein the set of biometric data uniquely identifies at least two users.

16. The non-transitory computer-readable medium of claim 15, the method further comprising:
storing, in a second database, a device identifier in association with an owner challenge response;
receiving, from the first biometrically secured point of sale device, the device identifier;
receiving, from the first biometrically secured point of sale device, the owner challenge response;
receiving the owner challenge response from the first biometrically secured point of sale device; and
creating a key pair for communication with the first biometrically secured point of sale device after and in response to receiving the owner challenge response from the first biometrically secured point of sale device.

17. The non-transitory computer-readable medium of claim 15, the method further comprising:
receiving the encrypted set of biometric data from the second biometrically secured point of sale device;
receiving, from the first biometrically secured point of sale device, a new encrypted biometric data element, wherein the new encrypted biometric data element is a new biometric data element encrypted using the first master encryption key;
storing, in the database, the new encrypted biometric data element with the encrypted set of biometric data.

18. The non-transitory computer-readable medium of claim 17, the method further comprising:
pushing the new encrypted biometric data element to the second biometrically secured point of sale device.

19. The non-transitory computer-readable medium of claim 17, wherein:
the encrypted set of biometric data is stored in the database in association with a merchant identifier; and
the merchant identifier uniquely identifies an owner of the first and second biometrically secured point of sale devices.

20. The non-transitory computer-readable medium of claim 19, the method further comprising:
storing a second set of encrypted biometric data in the database, wherein the second set of encrypted biometric data is encrypted with a second master encryption key; and
transmitting the second set of encrypted biometric data to a fourth biometrically secured point of sale device;
wherein the encrypted set of biometric data is stored in the database in association with a second merchant identifier;
wherein the first master encryption key cannot decrypt the second set of encrypted biometric data; and
wherein the second merchant identifier uniquely identifies an owner of the fourth biometrically secured point of sale device.

21. A non-transitory computer-readable medium on a first biometrically secured point of sale device storing instructions that are executable by a secure execution environment to perform a method comprising:
generating an asymmetric key pair, wherein the asymmetric key pair includes a private key and a public key;
transferring the public key to a buffer for transmission to a second biometrically secured point of sale device;
receiving an encrypted master encryption key from the second biometrically secured point of sale device, wherein the encrypted master encryption key is a master encryption key that is encrypted with the public key;
decrypting, using the private key, the encrypted master encryption key;
receiving an encrypted set of biometric data, wherein the encrypted set of biometric data is a set of biometric data that is encrypted with the master encryption key;
storing the set of biometric data on a memory;

receiving a second public key from a third biometrically secured point of sale device;

encrypting the master encryption key with the second public key; and transferring a second encrypted master encryption key to the buffer for transmission to the third biometrically secured point of sale device, wherein the second encrypted master encryption key is the master encryption key that is encrypted with the second public key;

wherein the set of biometric data uniquely identifies at least two users.

22. The non-transitory computer-readable medium of claim 21, the method further comprising:

receiving a biometric login request;

comparing data from the biometric login request with data from the set of biometric data;

authorizing access based on the comparison step;

wherein the storing step includes writing the set of biometric data to the memory using the secure execution environment; and wherein the memory is only addressable by the secure execution environment.

23. The non-transitory computer-readable medium of claim 22, the method further comprising:

receiving, from a server, the encrypted master encryption key; and receiving, from the server, the encrypted set of biometric data.

24. The non-transitory computer-readable medium of claim 22, further comprising:

storing, in nonvolatile memory, a device identifier;

wherein the device identifier uniquely identifies the first biometrically secured point of sale device;

wherein the encrypted master encryption key and encrypted set of biometric data are provided subsequent to transmission of the device identifier from the nonvolatile memory; and wherein the biometric login request is received via a touch screen.

* * * * *